Jan. 10, 1961    F. PASINI    2,967,902
PAPER SCREENING TAPES FOR HIGH TENSION ELECTRIC CABLES
Filed March 14, 1957
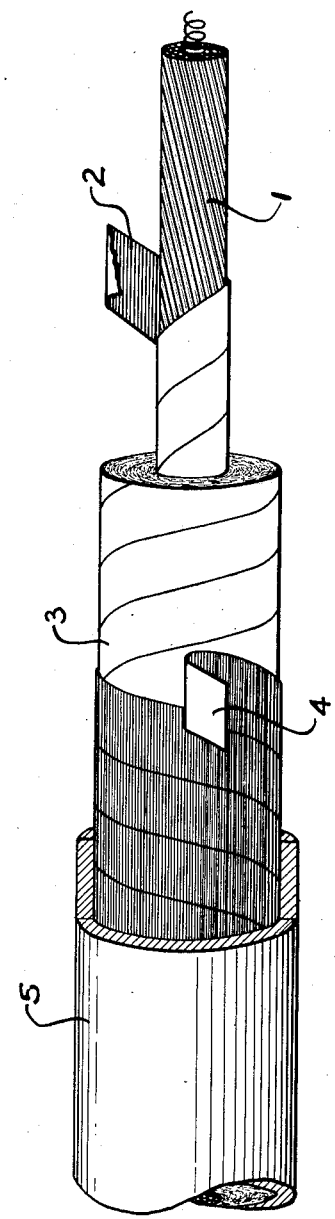
INVENTOR
FRANCO PASINI
By Morris Spector
ATTY.

United States Patent Office 2,967,902
Patented Jan. 10, 1961

2,967,902

PAPER SCREENING TAPES FOR HIGH TENSION ELECTRIC CABLES

Franco Pasini, Milan, Italy, assignor to Pirelli Societa per Azioni, Milan, Italy Filed Mar. 14, 1957, Ser. No. 645,972

Claims priority, application Italy Mar. 16, 1956

4 Claims. (Cl. 174—102)

The present invention relates to screening tapes employed in the construction of high tension electric cables having an insulation consisting of paper impregnated with oils or oil compounds and which are enclosed in a metal sheath, generally of lead or aluminium.

Screened high tension electric cables have long been known in which it has been endeavored to obviate the drawbacks due to uneven distribution of the electric field caused by the metal surfaces of the conductors and of the cable sheath, which surfaces are not perfectly smooth. In fact, the conductors of such cables are generally stranded wires or ropes which, owing to their conformation, have an undulating surface which follows the profile of the outer layer of wires. Furthermore, the outer sheath of the cable, in addition to not adhering sufficiently to the insulating material of the cable core, may have along its inner surface dents which have been made for the most diverse reasons during the application of the sheath by drawing or during the laying or installation of said cable.

This lack of adhesion to the insulating material or of smoothness of the metal surfaces is the cause of electric discharges which produce deterioration of the insulating material and reduce the life of the cable. It is precisely in order to neutralize the harmful effect of these uneven surfaces that recourse is usefully had, as is known, to the use of screening tapes which are formed of thin strips of conductive material placed in direct contact with the metal surface to be screened and wound in a spiral on the conductor or over the insulation thereof with the edges touching or overlapping by a certain amount.

The screening strips employed may be made of metal or of any other material which has been made conductive.

Thus, for example, it is known that a sheet of paper may be obtained so that it exhibits electrical conductivity on the surface or in the mass. In the first case, the sheet is coated on one face with a layer of conductive varnish, as is described in French Patent No. 1,066,664, while in the second case there is incorporated in the cellulose fibre pulp, during manufacture, an electrically conductive powder, for example metal powder, or graphite or carbon black, which is finely subdivided and uniformly dispersed in the mass, so as to obtain homogeneous conductivity in the mass. A cable provided with screening tapes produced in this second manner is described in United States Patent No. 2,102,129. The conducting strands are bound with strips of paper which has been made conductive by incorporating carbon black of the conductive type, then follows the insulating layers and over this there is applied a second winding of strips of conductive paper which will be in contact with the metal sheath of the cable.

In such a cable, the two screening tapes are in direct contact with the insulating material of the cable core and this fact gives rise to considerable drawbacks. In fact, under the action of very intense alternating electric fields, the very minute particles of conductive substance and the small fibres of cellulose covered with these conductive particles are set in vibration and may even become detached and migrate into the impregnating mixture of the insulating material of the cable. This permits a dissipation of energy in the dielectric which is manifested in an increase in the ionization factor of the cable, which, as is known, is determined by the difference in the power factor or angle of loss of the dielectric of the cable for two specific values of the voltage applied, generally two and a half times the operating voltage of the cable.

This drawback is accentuated in the case where a very fluid impregnating mixture is employed. In fact, if the viscosity of the medium is low, the vibrations of the conductive particles and of the small cellulose fibres covered with these particles are damped only to a small extent by said medium and the probability of the detachment thereof is increased.

It has been found that, for the purpose of blocking the movement of the particles of carbon black, it is very useful to cover the face of the sheet of conductive paper which is in direct contact with the insulating material of the conductor or conductors of the cable with a layer or coating which is also insulating and adheres well, which may be constituted by a film of varnish or, in particular, by a coating of cellulose fibres.

The principal object of the present invention is attained by the use of paper screening tapes for high tension electric cables which are formed from sheets of paper comprising two superposed layers firmly bonded to each other, one of which is insulating and the other conductive. The insulating layer may be constituted by a film of varnish, for example with a base of ethyl cellulose, viscose, dextrin, etc., or by cellulose fibres, intimately interwoven with those of the conductive layer with which they are already brought into direct contact during the moist stage of the manufacture of the sheets of paper. The conductive layer is constituted by cellulose fibres uniformly charged with a conductive powder, preferably carbon black of the conductive type.

By means of this arrangement, an advantage is also obtained in comparison with the above-mentioned insulating paper having one face covered with electrically conductive varnish. In fact, in that paper the conductive layer is a simple film having a conductivity distinctly inferior to that of the paper forming the present invention and, moreover, the complete or partial detachment of the small fibres and of the conductive particles is not effectively prevented owing to the fragility of the conductive varnish normally employed.

Sheets of paper according to the present invention may be manufactured, for example, by the continuous machine known by the name "Multi-lay" in the process of manufacture of paper. For such purpose, during the working which the paper pulp undergoes in the tanks or vats, known as "hollanders," for washing and disaggregating the fibres before the sheet is made, said pulp can be loaded or filled uniformly with the conductive powder, preferably carbon black, in a finely subdivided state. For the subsequent manufacture of the sheet having the abovementioned characteristics, the liquid pulp which enters the continuous machine will be of two kinds: one charged with conductive powder and one which is not loaded therewith, and the two kinds of pulp are spread each one separately on two continuous wire gauze elements having a very fine mesh, known by the name of "Fourdrinier net or gauze," which, moving along, transport the two thin layers, partly freeing them of the water by dripping and suction. As is well known, such gauzes, in addition to the continuous feed movement, also have a transverse oscillating movement which serves to make the thickness of the layer uniform and to impart a transverse direction to a certain part of the cellulose fibres.

The thin layers of pulp on the two gauze elements, one of which layers is loaded with a conductive powder and the other not, can be superposed in the aforesaid machine before being pressed between suitable rolls, so that they may be joined together after the moist working stage owing to the interentangling or felting of the fibres, so that at the end of the processing the resulting sheet consists of two layers, one insulating and the other electrically conductive, which are firmly bonded with one another.

From the two-layer sheets of paper, screening tapes are formed which are applied over the insulating material of the cable core and/or over the conducting strands, it being pointed out that the insulating layer is always in direct contact with the insulating material, while the conductive layer is in contact with the surface which it is desired to screen.

Electric cables screened in this way have a limited ionization factor.

The attainment of the above and further objects of the present invention will be apparent from the following specification taken in conjunction with the accompanying drawing forming a part thereof:

In the drawing, the single figure is a longitudinal view of a portion of a high tension cable embodying the present invention, with portions of the cable broken away to illustrate the interior construction thereof.

In the drawing, there is shown as a non-limitive example of a preferred embodiment of the present invention, a single-core high tension cable in which 1 designates the conducting strands which may be built around a hollow core as is customary in oil filled cables. The strands are covered with insulating material 3 consisting of impregnated paper, and the whole is enclosed within an outer metal casing or sheath. In direct contact with the strands 1 there is wound a screening tape 2. A screening tape 4 is wound on the insulator 3. The tapes 2 and 4 are of the constructions hereinabove set forth as constituting the novel cable screening tapes, and include a conductive surface and an insulating surface. The conductive surfaces of these tapes are shown dark and the insulating surfaces are shown light, so as to show that the conductive part of the tape strip 2 is in contact with the strand 1 and that the corresponding side of the tape strip 4 is in contact with the metal sheath of the cable, while the insulating parts of the strips 2 and 4 are always in contact with the insulation 3. The cable may be impregnated with the usual insulating compounds used with high tension cables.

The screening tapes by which the objects of the present invention are attained may be manufactured in ways different from that to which reference has been made above merely by way of example, and they may also be applied both to single-core cables and to multi-core cables, and in each single cable one or the other of the tapes 2 and 4 could be omitted. In all cases, however, care should always be taken that the tapes come within the field of application of the present invention.

In compliance with the requirements of the patent statutes there has here been shown and described a preferred embodiment of the present invention. It is however to be understood that the invention is not limited to the precise construction herein shown, the same being merely illustrative of the principle of the invention.

What is considered new and sought to be secured by Letters Patent is:

1. A high tension sheathed electric cable having insulation including impregnated paper characterized by the fact that the cable is provided with a paper tape screen that comprises an insulating layer of paper fibres intimately united with a superposed conducting layer of paper fibres and with the fibres of the two layers interentangled with one another at the interface of the two layers of the tape, said tape being in a position surrounding and extending substantially the length of the cable, and the conducting layer of the tape being in direct contact with the inner surface of the sheath of the cable.

2. A high tension electric cable having a conductor and having insulation including impregnated paper characterized by the fact that the cable conductor is screened by a unitary paper tape that comprises an insulating layer of paper fibres intimately united with a superposed conducting layer of paper fibres and with the fibres of the two layers interentangled with one another at the interface of the two layers of the tape, said tape being in a position within the cable wherein the conducting layer of the tape surrounds and is in direct contact with and substantially covers the outer surface of the cable conductor.

3. A high tension electric cable having at least one conducting member extending substantially the length of the cable and said cable having insulation including impregnated paper and screening tape, characterized by the fact that the screening tape is essentially formed of paper and comprises two superposed layers of cellulose fibre pulp firmly bonded to one another with the fibres of the two layers intertangled with one another at their interfaces to constitute a single sheet, one of which layers is insulating and the other conductive, the latter being obtained by the incorporation of an electrically conductive powder in the cellulose fibre pulp, the conductive layer being in contact with the conducting member of the cable for substantially the full length of the cable and the insulating layer of the screening tape being in contact with the cable insulation.

4. Screened high tension electric cable having a conductor surrounded by insulation including impregnated paper, and screening means comprising at least one paper tape that has two superposed paper layers firmly bonded to one another with the fibres of the two layers intertangled at their interface, one of said layers being insulating and the other layer being a sheet of paper rendered conductive by having electrical conductive powder incorporated in the cellulose fibre pulp of the paper, said tape being located within the cable and with one surface thereof in direct contact with a conducting surface of the cable characterized by the fact that the screening tape is applied in such manner as to have the insulating layer turned towards the insulation of the cable.

References Cited in the file of this patent

UNITED STATES PATENTS

| | | |
|---|---|---|
| 1,552,286 | Fish | Sept. 1, 1925 |
| 1,682,826 | Bidwell | Sept. 4, 1928 |
| 2,096,840 | Bormann | Oct. 26, 1937 |
| 2,102,129 | Rosch | Dec. 14, 1937 |
| 2,408,416 | Edgar et al. | Oct. 1, 1946 |
| 2,447,168 | Dean et al. | Aug. 17, 1948 |
| 2,593,146 | Leigh | Apr. 15, 1952 |
| 2,599,092 | Craig | June 3, 1952 |

FOREIGN PATENTS

| | | |
|---|---|---|
| 310,625 | Great Britain | May 2, 1929 |
| 527,734 | Great Britain | Oct. 15, 1940 |
| 726,305 | Great Britain | Mar. 16, 1955 |